United States Patent [19]

Böhm

[11] Patent Number: 4,631,951
[45] Date of Patent: Dec. 30, 1986

[54] ARRANGEMENT FOR TESTING A FLOW METER

[75] Inventor: Jürgen Böhm, Mannheim/Wallst., Fed. Rep. of Germany

[73] Assignee: Bopp & Reuther GmbH, Mannheim, Fed. Rep. of Germany

[21] Appl. No.: 762,776

[22] Filed: Aug. 5, 1985

[30] Foreign Application Priority Data

Aug. 4, 1984 [DE] Fed. Rep. of Germany ....... 3428805

[51] Int. Cl.⁴ .............................................. G01F 25/00
[52] U.S. Cl. ......................................................... 73/3
[58] Field of Search .............................................. 73/3

[56] References Cited

U.S. PATENT DOCUMENTS

| | | | |
|---|---|---|---|
| 3,254,523 | 6/1966 | Fisher et al. | 73/3 |
| 3,492,856 | 2/1970 | Francisco, Jr. | 73/3 |
| 3,517,308 | 6/1970 | Mirdadian | 73/3 |
| 4,481,805 | 11/1984 | Dobesh | 73/3 |

Primary Examiner—Stewart J. Levy
Assistant Examiner—Robert R. Raevis
Attorney, Agent, or Firm—Michael J. Striker

[57] ABSTRACT

An arrangement for testing a flow meter which issues a first train of pulses in response to the rotation of a rotatable member thereof includes a measuring cylinder-and-piston unit that has a cylinder, a piston slidably received in the cylinder and displacing a known comparison volume of a fluid out of the cylinder for delivery to the flow meter, and a piston rod which extends to the exterior of the cylinder. A photoelectric sensing arrangement is mounted on the piston rod for joint movement therewith along a stationary volume scale to scan distancing markings of such scale and issue a second train of pulses in response to the detection thereof. A first of such distancing markings is so situated that the sensing arrangement encounters the same only after the piston rod has covered an initial distance corresponding to a running-in distance of the piston. A lug with counter-markings corresponding to the distancing markings is mounted on the piston rod and interposed in the light path of the photoelectric sensing arrangement to mask and unmask the distancing markings and thus to achieve a pronounced light-dark effect. The first pulse of the second pulse train triggers the counting of the pulses of the first pulse train which are correlated to the number of revolutions of the rotatable member of the flow meter, and a correction is made after the termination of a test run for pulse fractions occurring at the beginning and at the end of the testing run.

5 Claims, 3 Drawing Figures

ARRANGEMENT FOR TESTING A FLOW METER

BACKGROUND OF THE INVENTION

The present invention relates to testing arrangements in general, and more particularly to an arrangement for testing a flow meter.

There are already known various constructions of flow meters, among them such which are incorporated into a pipeline and include rotating measuring wheels or similar rotating measuring members. For testing or calibrating such flow meters, there is often used, in series with the flow meter, a measuring or reference cylinder-and-piston unit which includes a housing or cylinder, in the interior of which there is slidably received a floating measuring piston which is displaced by the fluid being measured and which determines a comparison volume displaced out of the cylinder-and-piston unit between a start position and a stop position of the piston, such comparison volume being supplied to the flow meter. Typically, a piston rod is rigidly connected the the floating measuring piston and extends to the exterior of the cylinder. Usually, the duration of a testing operation, which takes place between the start position and the stop position, is determined by a predetermined number of first electrical pulses which are issued by the flow meter being tested. Then, a start pulse originating at the flow meter and issued after the end of the initial running-in displacement of the measuring piston triggers the counting or summation of a train of second electrical pulses which are issued by a pulse generator that responds to the movement of the piston rod. This counting or summation is then discontinued at the end of the testing run by the last pulse issued by the flow meter. The comparison parison volume which results from the counting or summation of the second pulses of the second pulse train is then compared with the volume which results from the first pulses of the first pulse train.

A testing arrangement of this type is known, for instance, from the U.S. Pat. No. 3,492,856. In this arrangement, the outwardly extending piston rod of the measuring piston is connected by means of a cross-beam rigidly with a toothed rack that is guided in sliding guides for movement parallel to the piston rod. This toothed rack then transfers the movements of the piston rod through a plurality of transmission gears to a shaft which is connected with a pulse generator. This pulse generator issues, in dependence on the rotational angular position of the shaft, a large number of electrical pulses. What is disadvantageous in this known testing arrangement is that, due to the rigid connection of the toothed rack with the piston rod, the second pulse train is already commenced to be issued at the very beginning of the movement of the measuring piston, even though the measuring piston has not yet covered or been displaced by the initial or running-in distance which is needed for the quieting or smoothing of the flow prior to the start of the testing run proper.

This problem has already been recognized and, in order to take this initial running-in distance of the measuring piston into account, it was proposed in one known testing arrangement to incorporate a time-delay member into the electric circuitry. This time-delay member inhibits the summation or counting of the pulses of the second pulse train, commencing with the first pulse issued by the pulse generator, until the end of its time-delay period. Then, the first pulse issued by the flow meter after the expiration of such time-delay period triggers, in its capacity as a starting pulse, the summation or counting of the pulses of the second pulse train. Herein, the initial running-in distance of the measuring piston until the beginning of the testing run proper is determined by the time-delay member, so that different initial running-in distances occur at different flow velocities. As a result of this, the amount of the fluid in the comparison volume that is available for the testing run may be too small at high fluid flow velocities.

In these testing arrangements, which have become known under the name "Miniprover", the dimensions of the measuring cylinder-and-piston units have been held so small that the entire testing arrangement can be mounted on a normal motor vehicle trailer. Under these circumstances, the comparison volume displaced from the measuring cylinder-and-piston unit by the measuring piston between its start and stop positions is nowadays so small that the measuring wheels of the flow meter being tested conduct only a few revolutions during the testing run. Typically, the volume of the fluid displaced by the measuring piston in such "Miniprovers" lies between 8 and 200 liters, depending on the size of the testing equipment. So, for example, the comparison volume is indicated to be about two gallons, that is, about 8 liters, in the U.S. Pat. No. 3,492,856. This means that the unavoidable tolerances in the shapes of the gear teeth, or an elastic deformation in the bulky scanning construction consisting of the piston rod, cross-beam and toothed rack, or even a minute irregularity in the issuance of the flow meter signals, have already marked deleterious influence on the accuracy of the measurement, resulting in substantial measurement errors. Experience has shown that the known "Miniprovers" tend to too great a scatter of the measurement results, because of the only small number of the pulses issued by the flow meter during the test run, the measurement results differing in dependence on the construction of the flow meter being tested.

SUMMARY OF THE INVENTION

Accordingly, it is a general object of the present invention to avoid the disadvantages of the prior art.

More particularly, it is an object of the present invention so to construct the arrangement of the type here under consideration as not to possess the disadvantages of the known constructions of this type.

Still another object of the present invention is so to design the arrangement of the above type as to achieve an improved accuracy of measurement independently of the construction of the flow meter being tested.

It is yet another object of the present invention to devise a testing arrangement of the above type which is relatively simple in construction, inexpensive to manufacture, easy to use, and reliable in operation.

In pursuance of these objects and others which will become apparent hereafter, one feature of the present invention resides in an arrangement for testing a flow meter having at least one rotatable member and issuing a first train of electrical pulses proportionally to the extent of rotation of the rotatable member, which arrangement comprises a measuring cylinder-and-piston unit including a cylinder, a piston slidably received in the cylinder and operative for displacing a fluid out of the latter, and a piston rod rigid with the piston and extending to the exterior of the cylinder, this unit being connected to the flow meter during testing to deliver the displaced fluid to the flow meter; means for correlating the number of pulses of the first train during a testing run to the number of complete revolutions of the rotatable member of the flow meter; means for generating a second train of electrical pulses proportionally to the extent of movement of the piston rod, including a stationary volume scale extending parallel and proximate to the piston rod and having a multitude of equidistant distancing markings; and sensing means mounted on the piston rod for joint movement therewith and operative for scanning the distancing markings and issuing the pulses of the second train in response to the detection thereof, the distancing markings being so arranged on the volume scale that the sensing means encounters a first one thereof only after the piston rod has moved from its rest position through a predetermined initial distance; and means for utilizing the pulse of the second train that corresponds to the first distancing marking for triggering the correlating means.

The present invention is based on the recognition of the fact that the spreading or scattering of the measuring results is primarily caused by irregular, that is, not volume-proportional, pulse issuance. Thus, it was discovered that, even in turbine counters, even the distribution error in the blades of the turbine wheel which is customary and acceptable in the industry, is sufficient to cause a no longer acceptable measuring result scattering during the use of a "Miniprover" as the testing arrangement. The scattering effect is even more pronounced in conjunction with oval gear flow meters, inasmuch as, even here, the issuence of the pulses during each revolution is not proportional to the volume, in that the transmission ratio of such oval gears constantly changes and even the fluid volume varies depending on the angular position.

As a result of the fact that, according to the present invention, the number of the pulses issued by the flow meter between the start and the termination of the testing run is coordinated or correlated to the number of revolutions of the rotatable member or measuring wheel of the flow meter, the position of such measuring wheels is identical at the beginning and at the end of the testing run, so that all irregularities which occur periodically with the rotation of the measuring wheel are securely eliminated. This is also valid for oscillations which are caused by the magnetic couplings built into the flow meter and attributable to the irregular operation, since such oscillations recur with the period of complete measuring wheel revolutions. The sensor which generates the second pulse train is mounted directly at the end of the piston rod and scans during the movement of the measuring piston the non-loaded and stationary volume scale that is provided with the distancing markings. In this manner, there are eliminated even those measuring errors which are otherwise attributable to the elastic deformation and/or manufacturing tolerance caused distribution errors of the scanning structure. The scanning of the volume scale is accomplished in a non-contacting fashion, that is, with the avoidance of any friction and practically without delay and in a force-free manner, and the distancing marks can be provided on the volume scale at very precise distancing with respect to one another.

Inasmuch as the distancing markings only commence at the end of the initial running-in distance of the measuring piston, the same part of the measuring cylinder is available for the running-in of the measuring piston under all circumstances, that is, regardless of the flow velocity, so that the measurement also commences in all cases at the same position of the measuring piston and the remaining part of the stroke of the measuring piston, and thus the remaining volume of the fluid in the measuring cylinder, is always available for the conduct of the testing run and for the determination of the integral or complete revolution number of the measuring wheel of the flow meter during the test run proper. The first signal or pulse issued by the sensor of the piston rod is herein used directly as the triggering signal for the beginning of the counting of the pulse train, so that time-delay members are no longer necessary.

According to another aspect of the invention, the testing arrangement further comprises a clock issuing a train of clocking oscillations, first counting means for counting the number of oscillations Tm occurring during a time period elapsing between a first and a last of the pulses of the first pulse train, second counting means for counting the number of oscillations Tp occurring during a time period elapsing between the first and last pulses of the second pulse train which respectively follow the first and last pulses of the first pulse train, means for setting the numbers of oscillations Tm and Tp in a ratio, and means for deriving a number q of pulses of the first pulse train that is corrected for pulse fractions occurring in the second pulse train during the testing run, by multiplying the ratio with a number of pulses m of the second pulse train during the testing run. As a result of this correction, there are captured even the pulse fractions occurring during the testing run between the start and stop. In this manner, the measuring accuracy is further enhanced.

In those instances where a transmission with a non-integral transmission ratio is interposed between the measuring wheel and the pulse generator of the flow meter, it can happen that an integral multiple of the measuring wheel revolutions results in a non-integral number of pulses issued by the pulse generator of the flow meter. In order to avoid the measuring error attributable to such non-integral number of pulses, it is proposed by the present invention to perform a time correction to the next complete pulse. In this connection, it was recognized that, in conjunction with the above-mentioned correction, it is possible simultaneously to take the pulse fractions of the first and second pulse trains into consideration.

According to another facet of the present invention, it is possible to determine the number of pulses issued by the flow meter during the test run so as to be correlated to the number of complete revolutions of the measuring wheel of the flow meter by providing computing means which includes data storage means that stores to known number of the pulses of the first pulse train per revolution of the measuring wheel or a similar rotatable member of the flow meter to be tested, means for storing the number of pulses of the first pulse train that occurs during an entire stroke of the piston on the course of a pre-testing run, and means for calculating from the stored number and from the known number the number of complete revolutions of the rotatable member of the flow meter and thus the number of pulses of the first pulse train occurring during the testing run.

It is further advantageous when, in accordance with the present invention, the distancing markings include alternating bars and gaps of substantially the same widths, when the sensing means includes a light source which illuminates the bars and gaps and a photoelectric sensor which detects the influence of the bars and gaps on the light issued by the light source, and when there is further provided a masking lug also mounted on the piston rod for joint movement therewith, interposed between the light source and the sensor, and including a smaller number of countermarkings corresponding to said distancing markings and presenting, in cooperation with said distancing markings, a light-dark effect for the photosensitive sensor. In this manner, there is obtained for the photosensitive diode of other sensor during the movement of the piston rod a light-dark contrast effect which stretches over a greater area and thus can be more easily detected by the sensor. This effect is caused by the juxtaposition of the bars of the lug with either the bars or the gaps of the volume scale, with attendand covering and uncovering of the gaps. Advantageously, the volume scale and the masking lug are made of a transparent material and the light source and sensor are arranged across such lug and scale from one another, so that the light penetrates through the gaps between the respective bars of the lug and scale.

The novel features which are considered as characteristic of the invention are set forth in particular in the appended claims. The improved testing arrangement itself, however, both as to its construction and its mode of operation, together with additional features and advantages thereof, will be best understood upon perusal of the following detailed description of certain specific embodiments with reference to the accompanying drawing.

DETAILED DESCRIPTION OF THE PREFERRED EMBODIMENT

Figure 1:
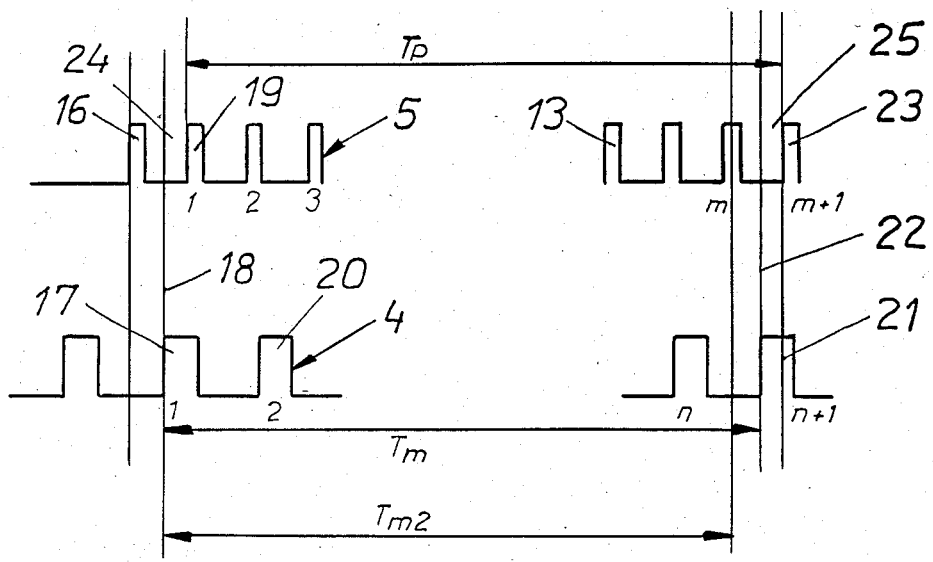
FIG. 1 is a diagrammatic representation showing the association of pulses of a first train originating at a flow meter with pulses of a second pulse train originating at a piston rod of a measuring cylinder-and-piston unit.
Figure 2:
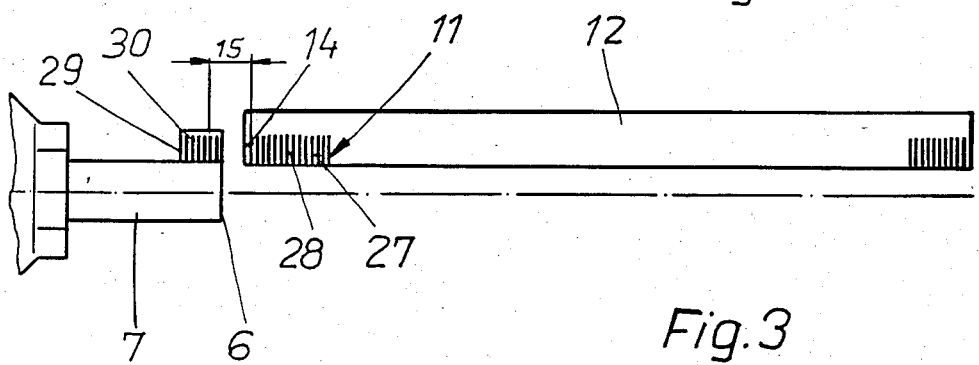
FIG. 2 is a somewhat diagrammatic side elevational view showing the cooperation of the piston rod with a stationary volume scale of the arrangement of the present invention.

Referring now to the drawing in detail, and first to FIG. 1 thereof, it may be seen that in this diagrammatic representation a first pulse train 4 which is generated in dependence on the operation of a flow meter being tested is shown at the lower region, while a second pulse train 5 which has originated at a measuring cylinder-and-piston unit is depicted at the upper region. As may be ascertained from FIGS. 2 and 3, the second pulse train 5 is issued by a sensor 8 which is mounted at an end 6 of a piston rod 7 of the above-mentioned measuring cylinder-and-piston unit. Both the flow meter being tested and the measuring cylinder-and-piston unit are of conventional construction, so that they need not, nor will they, be discussed here in any greater detail than necessary for understanding the present invention. Suffice it to say that the flow meter being measured includes at least one rotatable member, which will be referred to here as a rotatable measuring wheel even though it may be in fact a gear or other rotatable member and which is caused to rotate by the flow of a fluid through the flow meter at a speed proportionate to the amount of flow of the fluid through the flow meter, and that the measuring cylinder-and-piston unit includes a cylinder, a piston slidably received in the interior of the cylinder, and a piston rod that extends to the exterior of the cylinder, the piston displacing a known amount of the fluid per unit of time out of the interior of the cylinder and through suitable conduit means into the flow meter. In FIG. 2, only a portion of the cylinder and the portion of the piston rod 7 that extends to the exterior of the cylinder of the measuring cylinder-and-piston unit is shown.

Figure 3:
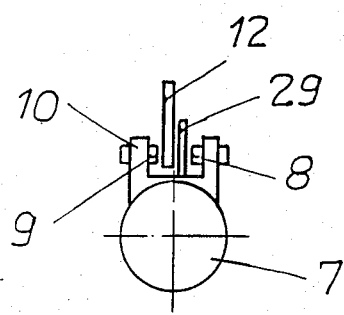
FIG. 3 is an end elevational view of the arrangement depicted in FIG. 2.

In the construction illustrated in FIGS. 2 and 3, the sensor 8 is constructed as a photosensitive diode and light emitted by a light source 9 is aimed at the same. The photosensitive diode 8 and the light source 9 are supported on the legs of a U-shaped carrier which is rigidly connected with the piston rod 7. During the testing operation, the photosensitive diode 8 optoelectrically scans equidistant distancing markings 11 of a stationary volume ruler 12 and issues during and in response to each passage of a distancing marking 11 an electrical signal or pulse 13 (see FIG. 1) of the second pulse train.

The volume ruler 12 has such a length that the distancing markings 11 provided thereon extend over a distance that corresponds to the entire useful stroke of the measuring piston or of the piston rod 7 which shares in the movement of the measuring piston so that the distance through which the piston rod 7 travels is an accurate indication of the volume of the fluid displaced by the piston of the measuring cylinder-and-piston unit and delivered to the flow meter being tested, for instance, for calibration purposes. The total number of the distancing markings 11 provided on the volume ruler or scale 12 is selected, by resorting to fine division, as large as possible, in order to obtain high resolution for the known reference volume displaced by the measuring piston of the measuring cylinder-and-piston unit.

FIG. 2 shows the piston rod 7 in its position assumed at the beginning of the testing operation. A first of the distancing markings 11, which is identified by the reference numeral 14 for differentiation purposes, provided on the volume scale 12 is provided only at the end of an initial displacement distance of the piston rod 7, which is denoted by the reference numeral 15. This initial displacement distance 15 is covered by the piston rod 7 while the measuring piston conducts its initial movement out of its end position and the flow of the fluid displaced by the measuring piston has not yet quieted down to its steady state. During the passage of the sensor 8 past this initial distancing marking 14, the photosensitive diode 8 issues an initial or starting signal 16 (see FIG. 1) for the second pulse train 5, which now triggers the start of the testing run at the occurrence of the next following pulse 17 of the first pulse train 4 at a starting time 18. Commencing with a second pulse 19 of the second pulse train 5 occurring at or after the starting time 18, pulses 13 of the second pulse train 5 are now counted or summated. The number of pulses 20 of the first pulse train 4 issued by the flow meter during the testing run is accomodated to the greatest possible multiple of the pulse number per measuring wheel revolution, so that a stop pulse 21 is issued by the flow meter being tested at the end of the last full measuring wheel revolution, which triggers a stop 22 of the testing run. As a result of this, the counting or summation of the pulses 13 of the second pulse train 5 originating at the sensor 8 of the piston rod 7 is discontinued at the occurrence of a next following pulse 23 of the second pulse train 5 after the stop 22. While the first pulse train 4 originating at the flow meter begins during the testing run with the rising flank of the first pulse 17 at the starting time 18 and ends with the rising flank of the last pulse 21 of the first pulse train 4 at the stop time 22, in the illustrated situation a time delay at the starting time 18 corresponding to a pulse duration fraction 24 occurs in the second pulse train 5 originating at the sensor 8 prior to the occurrence of the first pulse 19 and another time delay corresponding to a pulse duration fraction 25 is encountered at the stop 22 prior to the last pulse 23 of the second pulse train 5.

The distancing markings 11 of the volume scale or ruler 12 are constituted by opaque lines 27 and intervening transparent gaps 28, which are both of the same width. A masking lug 29 is arranged in front of the photodiode or sensor 8, the lug 29 being mounted on a carrier 10 which is mounted on the end portion 6 of the piston rod 7, together with the sensor 8 and the light source 9. This lug 29 is provided with countermarkings 30 corresponding to lines 27 and gaps 28 of the distancing markings 11 on the volume ruler 12 but being reduced in number. The volume ruler or scale 12 and the lug 29 are both made of a transparent material, so that a pronounced light or dark signal is alternatively received by the photosensitive diode or sensor 8 during the passage of the markings 30 on lug 29 past the markings 11 of the volume scale 12 due to the masking and unmasking of the transparent gaps 28 of the volume ruler 12 by the opaque lines of the markings 30 on lug 29.

In order to compensate for the pulse fractions 24 and 25 caused by the time delays at the starting time 18 and at the stop 22 in the pulses 13 of the second pulse train 5 originating at the sensor 8, or to take them into account, a timing quartz clock is provided which oscillates during the testing run. This timing quartz clock, which is of a conventional construction and thus has not been shown in the drawing, measures and records a time period Tm elapsing between the first pulse 17 and the last pulse 21 of the first pulse train 4, on the one hand, and a time perion Tp elapsing between the first pulse 19 and the last pulse 23 of the second pulse train 5 occurring during the testing run. If now m is used to indicate the number of the summated or counted pulses during the time period Tp and q the total amount of pulses changed by the pulse fractions 24 and 25, then the following equation applies:

$$\frac{Tm}{q} = \frac{Tp}{m}.$$

From this, there is obtained the corrected total pulse amount $$q = \frac{Tm}{Tp} \cdot m$$

Thus, for taking the pulse fractions 24 and 25 into account, it is merely necessary to multiply the ratio of Tm:Tp by the number m of the summated or counted pulses 13. The multiplication is accomplished in a computer of the testing equipment.

A scaling factor $k_m$ for the flow meter results from a total number n of the pulses 20 of the first pulse train issued during the testing run per a unit of volume V (selected for the testing equipment) from the equation $$k_m = \frac{n}{V}.$$

Correspondingly, a $k_p$ value of the testing equipment is obtained from the equation $$k_p = \frac{q}{V}.$$

Now, if the two units of volume V are considered to be identical, there is obtained the equation $$\frac{n}{k_m} = \frac{q}{k_p}, \text{ and from this } k_m = \frac{n \cdot k_p}{q}.$$

If the previously mentioned equation is substituted for q in the above equation, the result is $$k_m = \frac{k_p \cdot n \cdot T_p}{m \cdot Tm}.$$

If a non-integral total pulse number r results for a testing run that takes place during a time period Tm2 when the pulse number per measuring wheel revolution of the flow meter is not integral, the pulse 21 which follows this non-integral pulse number r is utilized as stop pulse for the second pulse train 5, so that the calculation starts from an integral number n. Here, the following equations apply:

$$\frac{Tm2}{r} = \frac{Tm}{n} \text{ and } \frac{Tp}{m} = \frac{Tm2}{q}.$$

Furthermore, the following is valid for the k values:

$$k_m = \frac{r}{V} \text{ and } k_p = \frac{q}{V}.$$

After the setting of V equal, the following obtains:

$$\frac{r}{k_m} = \frac{q}{k_p} \text{ and thus } km = \frac{k_p \cdot r}{q}.$$

Now, if r and q are isolated from the previous equations and substituted into the above equations, what is obtained is:

$$k_m = \frac{k_p \cdot n \cdot T_p}{Tm \cdot m}.$$

The recognition from this is that the correction of the first pulse train 4 can be accomplished independently of Tm2 and results solely from the multiplication with the ratio Tp:Tm simulataneously with the correction for the pulse fragments 24 and 25 of the second pulse train 5 issued by the sensor 8 of the piston rod 7.

It will be understood that each of the elements described above, or two or more together, may also find a useful application in other types of arrangements differing from the type described above.

While the invention has been illustrated and described as embodied in a testing arrangement for a flow meter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features which, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. An arrangement for testing a flow meter having at least one rotatable member and issuing a first train of electrical pulses proportionally to the extent of rotation of the rotatable member, comprising a measuring cylinder-and-piston unit including a cylinder, a piston slidably received in said cylinder and operative for displacing a fluid out of the latter, and a piston rod rigid with said piston and extending to the exterior of said cylinder, said unit being connected to the flow meter during testing to deliver the displaced fluid to the flow meter; means for correlating the number of pulses of the first train during a testing run to the number of complete revolutions of the rotatable member of the flow meter; means for generating a second train of electrical pulses proportionally to the extent of movement of said piston rod, including a stationary volume scale extending parallel and proximate to said piston rod and having a multitude of equidistant distancing markings, and sensing means mounted on said piston rod for joint movement therewith and operative for scanning said distancing markings and issuing the pulses of the second train in response to the detection thereof, said distancing markings being so arranged on said volume scale that said sensor encounters a first one thereof only after said piston rod has moved from its rest position through a predetermined initial distance; and means for utilizing the pulse of said second train that corresponds to said first distancing marking for triggering said correlating means.

2. The arrangement as defined in claim 1, and further comprising computing means including data storage means storing the known number of the pulses of the first pulse train per revolution of the rotatable member of the respective flow meter to be tested, means for storing the number of the pulses of the first pulse train that occur during the entire stroke of the piston in the course of a pre-testing run, and means for calculating from said stored number and from said known number the number of complete revolutions of the rotatable member of the flow meter and thus the number of the pulses of the first pulse train occurring during said testing run.

3. The arrangement as defined in claim 1, wherein said distancing markings include alternating opaque bars and transparent gaps of substantially the same widths; wherein said sensing means includes a light source which illuminates said bars and gaps and a photoelectric sensor which detects the influence of said bars and gaps on the light issued by said light source; and further comprising a masking lug mounted on said piston rod for joint movement therewith, interposed between said light source and said sensor and including a smaller number of countermarkings corresponding to said distancing markings and presenting, in cooperation with said distancing markings, a light or dark signal for said photosensitive sensor.

4. An arrangement for testing a flow meter having at least one rotatable member and issuing a first train of electrical pulses proportionally to the extent of rotation of the rotatable member, comprising a measuring cylinder-and-piston unit including a cylinder, a piston slidably received in said cylinder and operative for displacing a fluid out of the latter, and a piston rod rigid with said piston and extending to the exterior of said cylinder, said unit being connected to the flow meter during testing to deliver the displaced fluid to the flow meter; means for correlating the number of pulses of the first train during a testing run to the number of complete revolutions of the rotatable member of the flow meter; means for generating a second train of electrical pulses proportionally to the extent of movement of said piston rod, including a stationary volume scale extending parallel and proximate to said piston rod and having a multitude of equidistant distancing markings, and sensing means mounted on said piston rod for joint movement therewith and operative for scanning said distancing markings and issuing the pulses of the second train in response to the detection thereof, said distancing markings being so arranged on said volume scale that said sensor encounters a first one thereof only after said piston rod has moved from its rest position through a predetermined initial distance; means for utilizing the pulse of said second train that corresponds to said first distancing marking for triggering said correlating means; and further comprising a clock issuing a train of clocking oscillations, first counting means for counting the number of oscillations Tm occurring during a time period elapsing between a first and a last of said pulses of said first pulse train, second counting means for counting the number of oscillations Tp occurring during a time period elapsing between the first and last pulses of said second pulse train which respectively follow said first and last pulses of said first pulse train; means for setting said numbers of oscillations Tm and Tp in a ratio; and means for deriving a number q of pulses of the first pulse train that is corrected for pulse fractions occurring in the second pulse train during the testing run by multiplying said ratio with a number m of the pulses of the second pulse train in accordance with the equation $$q = \frac{Tm}{Tp} \cdot m.$$

5. The arrangement as defined in claim 4, and further comprising means for utilizing, with a non-integral total pulse number r for the testing run, the pulse of the second pulse train that follows this total number r as a stop pulse which terminates the counting of said pulses of said second train.

* * * * *